United States Patent
Randolph

(10) Patent No.: US 11,460,146 B1
(45) Date of Patent: Oct. 4, 2022

(54) WEIGHT TRANSFER DEVICE

(71) Applicant: Antwon D. Randolph, San Ramon, CA (US)

(72) Inventor: Antwon D. Randolph, San Ramon, CA (US)

( * ) Notice: Subject to any disclaimer, the term of this patent is extended or adjusted under 35 U.S.C. 154(b) by 0 days.

(21) Appl. No.: 17/247,049

(22) Filed: Nov. 25, 2020

Related U.S. Application Data

(60) Provisional application No. 62/940,231, filed on Nov. 25, 2019.

(51) Int. Cl.
*F16M 11/00* (2006.01)
*F16M 11/20* (2006.01)
*F16M 11/22* (2006.01)

(52) U.S. Cl.
CPC .......... *F16M 11/2021* (2013.01); *F16M 11/22* (2013.01); *F16M 2200/08* (2013.01)

(58) Field of Classification Search
CPC ............................ F16M 11/2021; F16M 11/22
See application file for complete search history.

(56) References Cited

U.S. PATENT DOCUMENTS

| | | | | |
|---|---|---|---|---|
| 1,706,253 A | * | 3/1929 | Raymond | B62B 3/04 414/480 |
| 3,017,710 A | * | 1/1962 | Carlson | B60B 37/10 298/5 |
| 3,826,512 A | * | 7/1974 | Palmer | B62B 1/147 280/43.12 |
| 4,168,932 A | * | 9/1979 | Clark | B60P 3/062 298/38 |
| 5,271,169 A | * | 12/1993 | Konsztowicz | E01H 5/02 37/285 |
| 7,641,206 B2 | * | 1/2010 | Knoebel | B62B 3/08 280/47.34 |

* cited by examiner

*Primary Examiner* — Amy J. Sterling
(74) *Attorney, Agent, or Firm* — Adibi IP Group, PC; Amir V. Adibi; Andrew C. Palmer

(57) ABSTRACT

A weight transfer device is disclosed. In an embodiment, a weight transfer device includes a top surface and legs mounted to the top surface. The legs forming a load region and a ramp region of the top surface. A downward force applied to the ramp region causes the top surface to tilt downward toward the ramp region.

16 Claims, 6 Drawing Sheets

MOVEABLE CART OPERATION

MOVEABLE CART ON WEIGHT TRANSFER DEVICE

WEIGHT TRANSFER DEVICE

WEIGHT TRANSFER DEVICE

LOADED CART ON WEIGHT TRANSFER DEVICE

UNLOADING CART ON TILTED WEIGHT TRANSFER DEVICE

METHOD FOR FORMING A WEIGHT TRANSFER DEVICE

METHOD FOR USING A WEIGHT TRANSFER DEVICE

WEIGHT TRANSFER DEVICE

CROSS REFERENCE TO RELATED APPLICATIONS

This application claims the benefit under 35 U.S.C. § 119 of provisional U.S. patent application Ser. No. 62/940,231, entitled "Weight Transfer Device," filed on Nov. 25, 2019. The entire subject matter of the aforementioned patent documents is incorporated herein by reference.

TECHNICAL FIELD

The present invention relates to a weight transfer device for use with moveable carts.

BACKGROUND INFORMATION

Moveable carts have been in use for many years in warehouses and other locations to assist people with moving heavy loads. For example, a hand cart or hand truck is a type of moveable cart. To use a hand cart, a user places the cart in a load position on a horizontal surface. The user loads the hand cart with a heavy load to be moved. The user then applies a pulling force to a handle of the hand cart to transition (or tip) the hand cart from the load position to the rolling position. The pulling force causes the hand cart to tip onto its wheels, thereby allowing the hand cart to roll with the heavy load so that the user can move the load to the desired location. Depending on the weight of the load, the pulling force exerted by the user to transfer the weight of the load to the wheels of the cart may vary significantly. Typically the pulling force is generated by the arms, shoulders, and back of a user.

SUMMARY

In various embodiments, a weight transfer device (WTD) is provided that reduces the amount of upper body force provided by a user to tip a moveable cart into the rolling position. In one embodiment, the WTD includes a top surface that is mounted on two legs. The legs extend across a portion of the length of the top surface to form a load region and a ramp region. During operation, a moveable cart, such as a hand truck, is placed within the load region. The cart is then loaded with items to be moved. After the cart is loaded, the user applies force to the ramp region to tilt the WTD downward toward the user. The downward tilt causes the cart to roll back toward the user in a tipped orientation. The user simply guides the cart off of the ramp portion of the WTD so that the cart is in the rolling position. By using the WTD, the user does not have to manually tip the cart with the heavy load using upper body strength. Thus, the WTD reduces the amount of a user's upper body force needed to tip a moveable cart into the rolling position, thereby reducing back, shoulder, and arm stress of the user.

In another embodiment, a weight transfer device includes a top surface and legs mounted to the top surface. The legs forming a load region and a ramp region of the top surface. A downward force applied to the ramp region causes the top surface to tilt downward toward the ramp region.

In yet another embodiment, a method is provided for forming a weight transfer device. The method includes forming a top surface, and forming legs mounted to the top surface. The legs forming a load region and a ramp region of the top surface, and a downward force applied to the ramp region causes the top surface to tilt downward toward the ramp region.

The foregoing is a summary and thus contains, by necessity, simplifications, generalizations and omissions of detail; consequently it is appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

In various embodiments, a weight transfer device is provided that reduces the amount of a user's upper body force needed to tip a moveable cart into the rolling position.

Figure 1A:
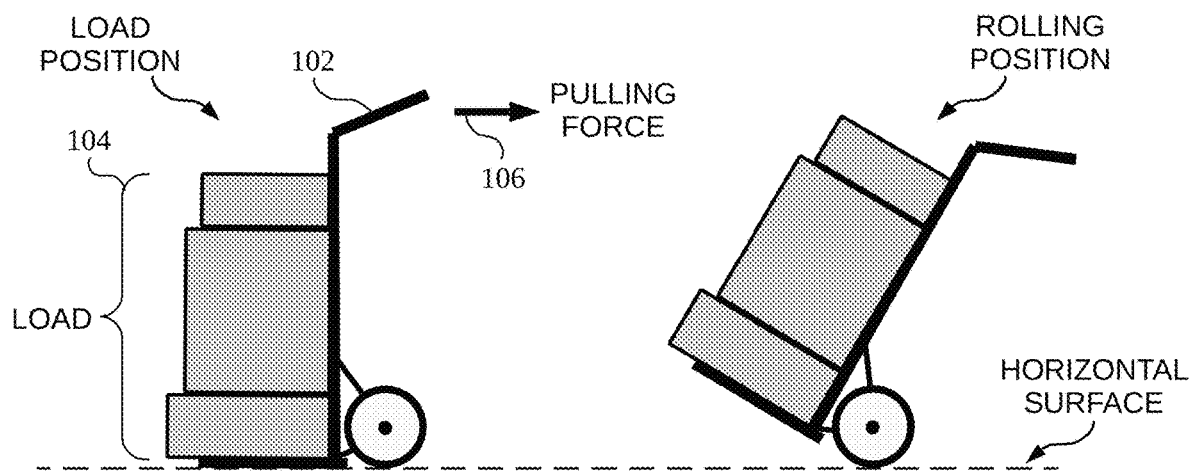
FIG. 1A illustrates the operation of a typical hand cart.

FIG. 1A illustrates the operation of a typical hand cart 102. The hand cart 102 rests in the load position on a horizontal surface. The hand cart 102 is loaded with a load 104 to be moved. A pulling force 106 is applied to the hand cart to transition the hand cart 102 from the load position to the rolling position. The pulling force 106 causes the hand cart 102 to tip onto its wheels, thereby allowing the hand cart to roll with the load. Unfortunately, depending on the weight of the load 104 the pulling force 106 may be significant. Typically the pulling force is generated by the arms, shoulders, and back of a user. Using the hand cart 102 throughout the course of a day may result in stress to these body parts. In various exemplary embodiments, the weight transfer device described herein mitigates this stress.

Figure 1B:
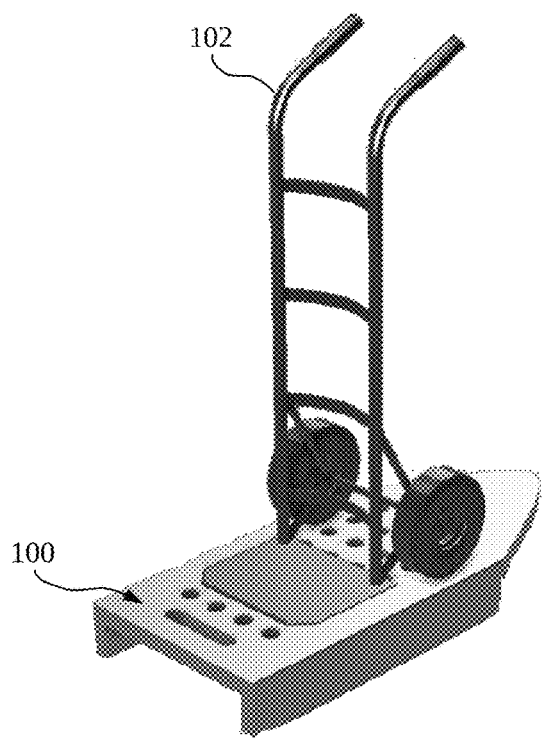
FIG. 1B shows an exemplary embodiment of a weight transfer device for use with the hand cart shown in FIG. 1A.

FIG. 1B shows an exemplary embodiment of a weight transfer device 100. For example, the WTD 100 is shown with the hand cart 102. In various embodiments, the WTD 100 operates to mitigate the stress to users caused by hand cart use. For example, the WTD 100 operates to assist the user with transferring the weight of a load to the wheels of the hand cart. Thus, the stress of hand cart use experienced by the user is mitigated. A more detailed description of the WTD 100 and its operation is provided below.

Figure 2:
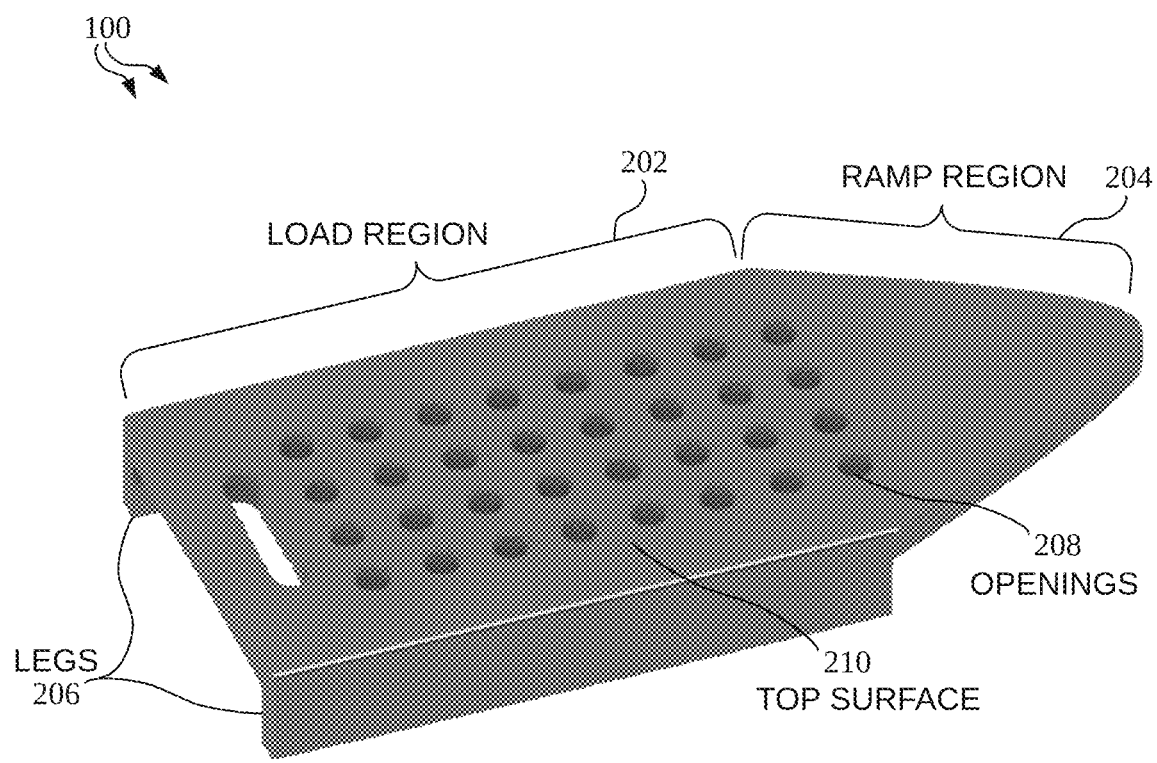
FIG. 2 shows an embodiment of a perspective view of the weight transfer device shown in FIG. 1B.

FIG. 2 shows an embodiment of a perspective view of the weight transfer device 100 shown in FIG. 1B. The WTD 100 comprises a top surface 210 that is connected to legs 206. In an embodiment, the top surface 210 includes holes, openings, or perforations 208 that reduce the weight of the top surface and provide a way for water to drain from the top surface. When the legs 206 are connected to the top surface, a load region 202 is defined that is a region supported by the legs. A ramp region 204 is also defined that is a portion of the top surface 210 that is not supported by the legs 206. In an embodiment, the WTD 100 comprises wood, metal, plastic, or other suitable material.

Figure 3:
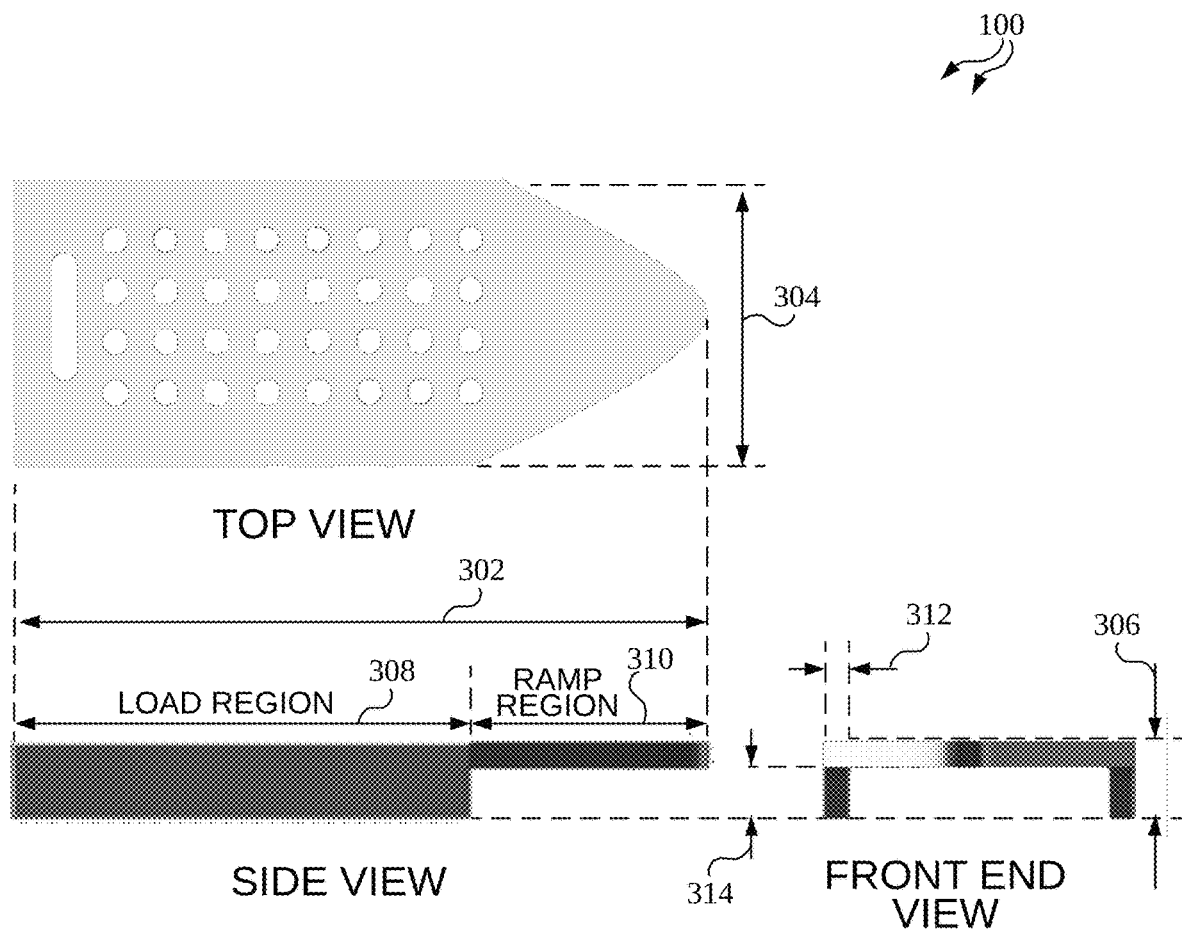
FIG. 3 shows three views of the weight transfer device shown in FIG. 2.

FIG. 3 shows three views of the weight transfer device 100 shown in FIG. 2. A top view shows a width 304 of the top surface. A side view shows a length 302 of the top surface, a length 308 of the legs forming the load region, and a length 310 of the ramp region. In an embodiment, the legs have non-square corners to facilitate tilting. A front view shows an overall height 306 of the WTD 100, and a width 312 and height 314 of the legs. It should be noted that the dimensions of the WTD shown in FIG. 3 are exemplary and that other dimensions can be utilized.

Figure 4A:
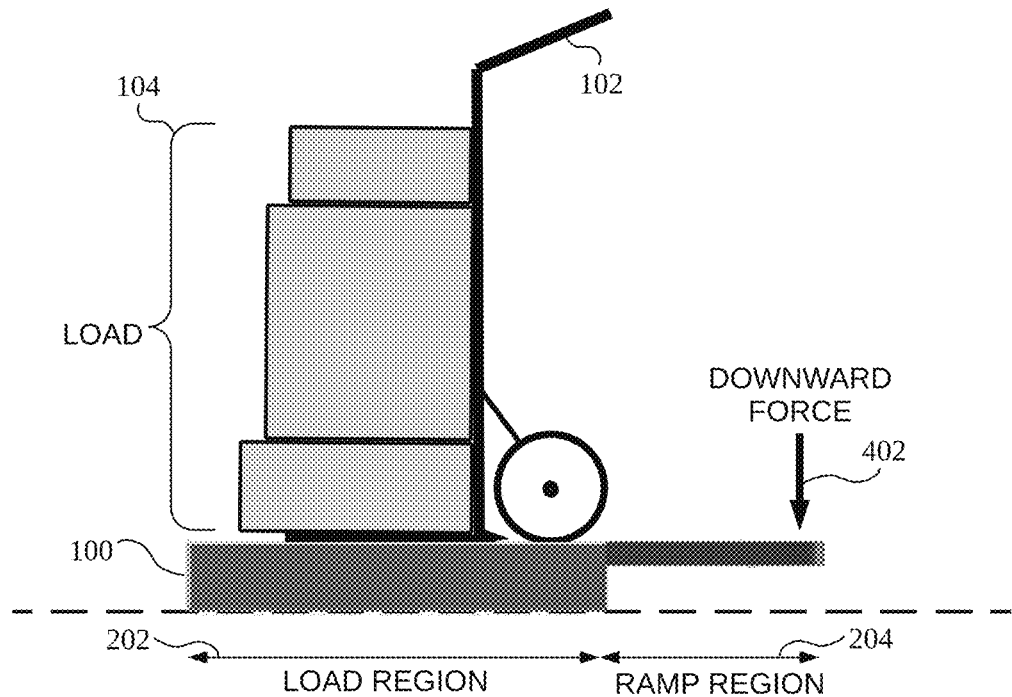
FIG. 4A shows a loaded hand cart sitting within a load region of the weight transfer device.

FIG. 4A shows a loaded hand cart 102 sitting within a load region 202 of the weight transfer device 100. The hand cart 102 includes a load 104. To utilize the WTD 100, a downward force 402 is exerted on the ramp region 204. For example, the downward force 402 is exerted at the edge of the ramp region 402. In an embodiment, a user exerts the downward force 402 using a foot to press down on the edge of the ramp region 204. When the downward force is exerted, the WTD 100 begins to tilt downward toward the end of the ramp region. The tilting of the WTD 100 is shown in detail in FIG. 4B.

Figure 4B:
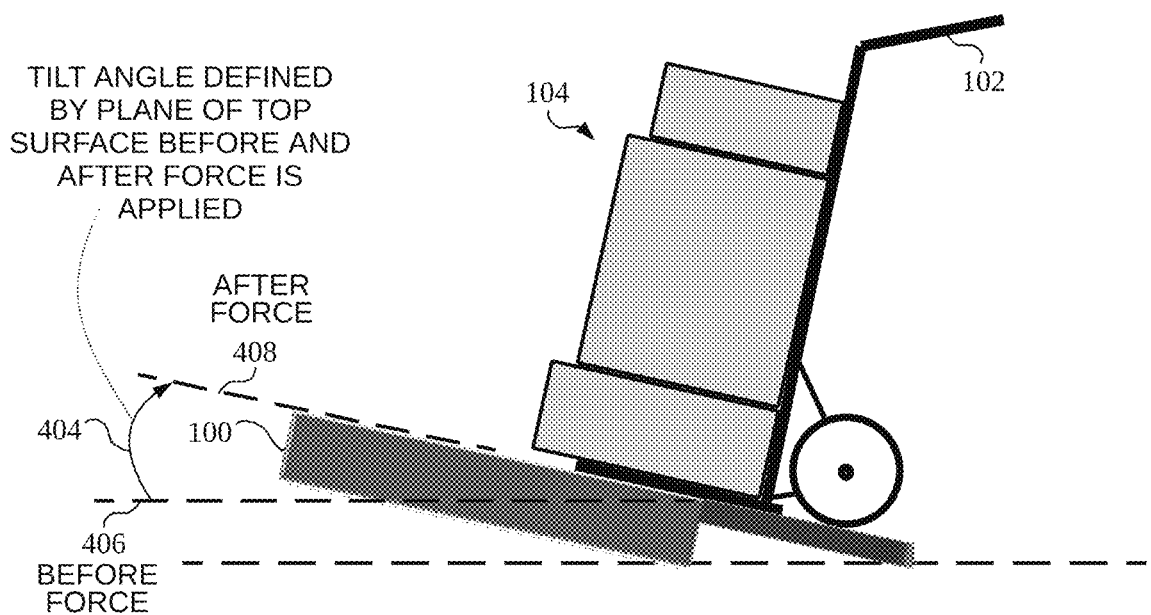
FIG. 4B shows the weight transfer device of FIG. 4A in a tilted position as a result of a downward force applied to the ramp region.

FIG. 4B shows the weight transfer device of FIG. 4A in a tilted position as a result of a downward force applied to the ramp region. For example, the downward force 402 causes the WTD 100 to tilt downward toward the ramp region such that a tilt angle 404 is formed. The tilt angle 404 is defined by the plane 406 of the top surface before the force is applied and the plane 408 of the top surface after the force is applied. In an embodiment, the tilt angle is approximately 15 degrees. For example, the tilt angle is determined from tangent[leg height(H)/ramp length(L)].

The hand cart 102 tilts with the WTD such that the weight of the load 104 transfers to the wheels of the hand cart 102. The user can then simply roll the hand cart off of the WTD and move the load as desired. Thus, the WTD operates to transfer the weight of the load to the wheels of the hand cart, thereby mitigating the pulling forces that would normally be used to operate the hand cart. Thus, the stress on the user's back, shoulder, and arms is reduced.

Figure 5:
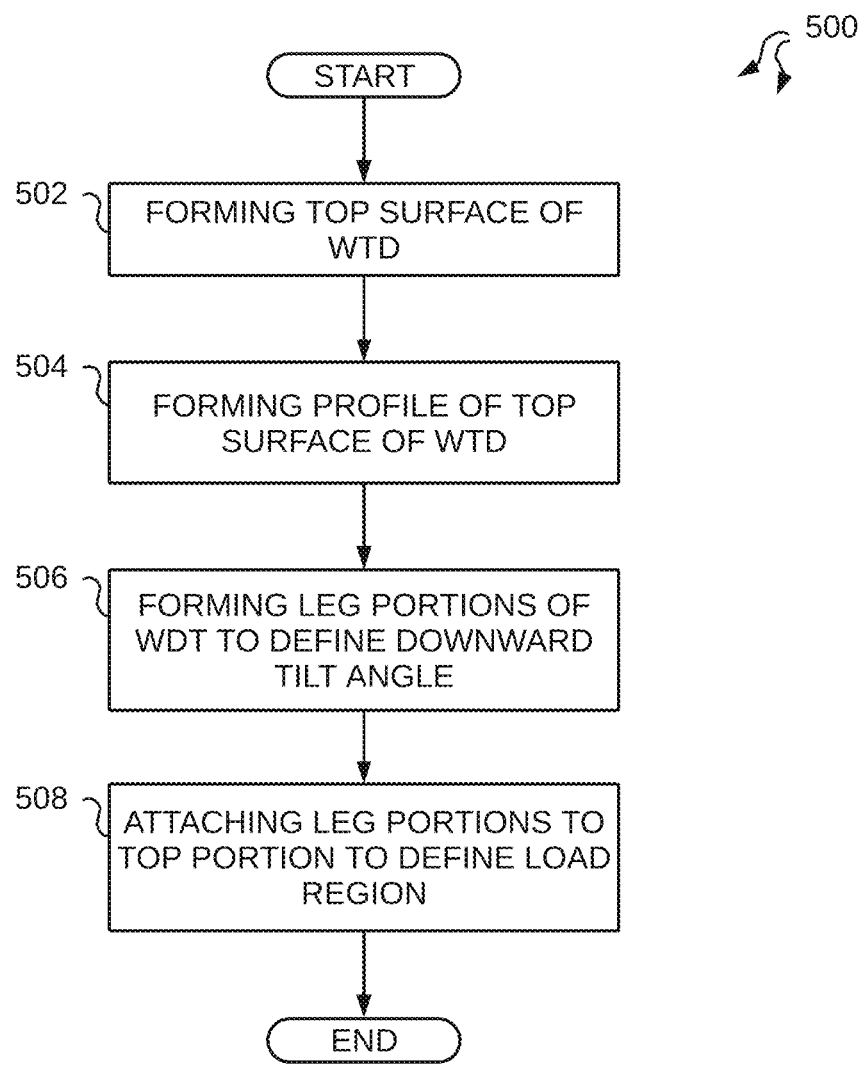
FIG. 5 shows an exemplary method for forming a weight transfer device.

FIG. 5 shows an exemplary method 500 for forming a weight transfer device. For example, the method 500 is suitable to form the weight transfer device 100 shown in FIGS. 1A-4B.

At block 502, a top surface of a weight transfer device is formed. For example, the top surface 210 is formed from wood, metal, plastic, or other suitable material.

At block 504, a profile of the top surface is formed. For example, the top surface is formed with a curved profile shape, as illustrated by the ramp region 204.

At block 506, leg portions of the WDT are formed. For example, the leg portions 206 have a height that is used to define a tilt angle of the WDT.

At block 508, the leg portions are attached to the top surface to define a load region of the WDT. For example, the load region 202 is defined. The length of the leg portions also defines a length of the ramp portion which is used with the height of the legs to determine a tilt angle, as described above.

Thus, the method 500 performs operations to form a weight transfer device. It should be noted that the method 500 is exemplary and that the operations can be changed, modified, added to, deleted, or otherwise rearranged within the scope of the embodiments.

Figure 6:
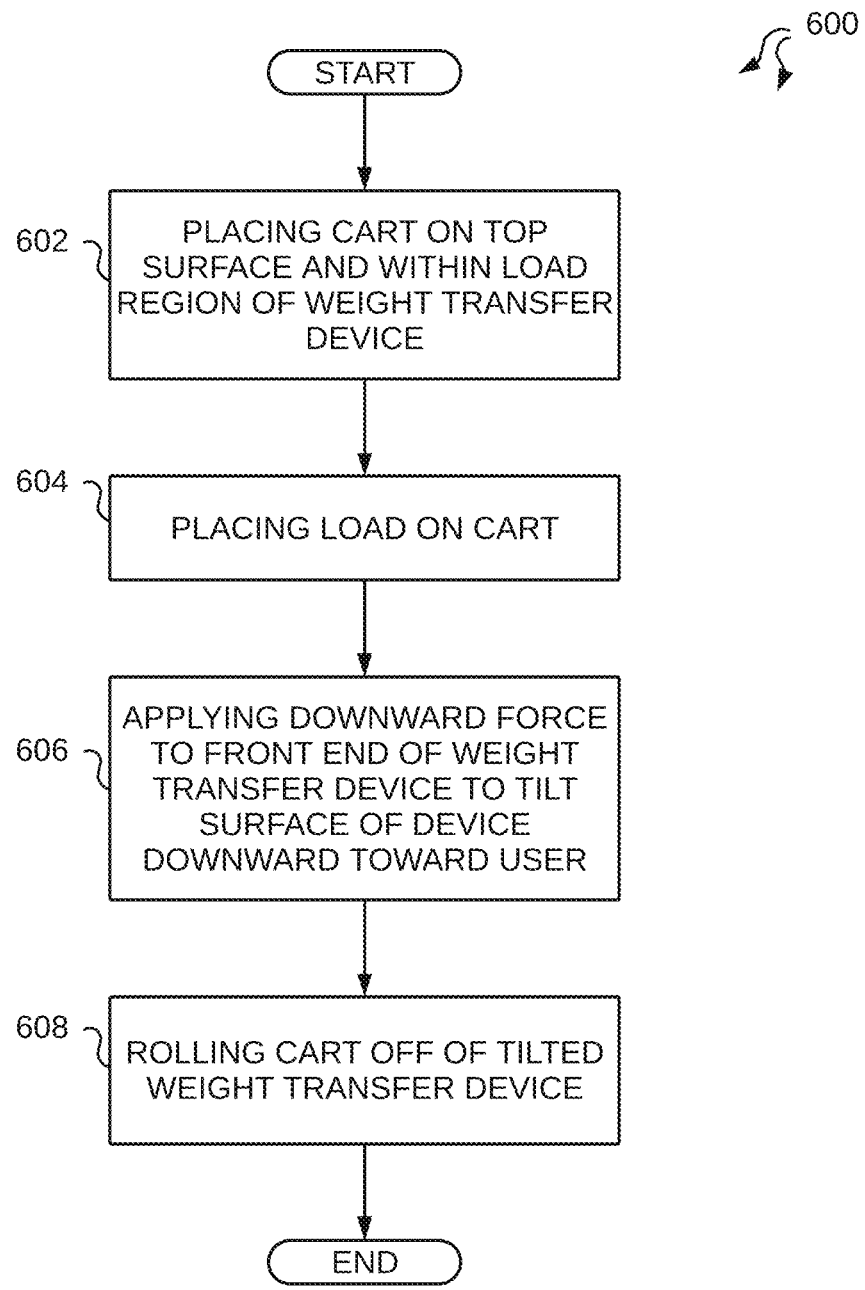
FIG. 6 shows an exemplary method for using a weight transfer device.

FIG. 6 shows an exemplary method 600 for using a weight transfer device. For example, the method 600 is suitable for using the weight transfer device 100 shown in FIGS. 1A-4B.

At block 602, placing a cart on the top surface and within the load region of a weight transfer device.

At block 604, placing a load on the cart. For example, the load 104 is placed on the cart 102.

At block 606, a downward force is applied to the end of the ramp portion to tilt the top surface downward to the user. For example, the downward force 404 is applied to the ramp portion to tilt the WDT according to the tilt angle 406.

At block 608, the cart is rolled off of the tilted WDT and moved to the desired location to deliver the load.

Thus, the method 600 performs operations for using a weight transfer device. It should be noted that the method 600 is exemplary and that the operations can be changed, modified, added to, deleted, or otherwise rearranged within the scope of the embodiments.

Although certain specific embodiments are described above in order to illustrate the invention, the invention is not limited to the specific embodiments. Accordingly, various modifications, adaptations, and combinations of various features of the described embodiments can be practiced without departing from the scope of the invention as set forth in the claims.

What is claimed is:

1. A weight transfer device, comprising:
  a top surface having a ramp region and a load region; and
  means for tilting the top surface in response to a downward force being applied to the ramp region such that the ramp region moves downward and the load region moves upward, wherein the means extends from a first end of the load region to a second end of the load region, wherein the ramp region extends away from the second end of the load region, and wherein the ramp region has a curved profile shape such that a first width at one end of the top surface is less than a second width at an opposite end of the top surface.

2. The weight transfer device of claim 1, wherein the means are legs that attach to the top surface, and wherein the legs extend downward towards a ground surface.

3. The weight transfer device of claim 1, wherein the weight transfer device has no wheels.

4. The weight transfer device of claim 2, wherein the legs have a height that is used to define a tilt angle of the weight transfer device, and wherein the legs extend linearly along a surface that is opposite the top surface of the weight transfer device.

5. A weight transfer device, comprising:
  a top surface having a ramp region and a load region; and
  legs mounted to the top surface, wherein the legs extend from a first end of the load region to a second end of the load region, wherein the ramp region extends away from the second end of the load region, wherein a downward force applied to the ramp region causes the load region to tilt about the second end, and wherein the ramp region has a curved profile shape such that a first width of the ramp region is less than a second width of the load region.

6. The weight transfer device of claim 5, wherein the weight transfer device has no wheels and no handlebar usable to apply an upward force.

7. The weight transfer device of claim 5, wherein the legs have a height that is used to define a tilt angle of the weight transfer device, and wherein the legs extend linearly along a surface that is opposite the top surface of the weight transfer device.

8. The weight transfer device of claim 5, wherein the top surface comprises one or more openings.

9. The weight transfer device of claim 5, wherein the tilt forms a tilt angle between a plane of the top surface before the downward force is applied and the plane of the top surface after the force is applied.

10. The weight transfer device of claim 5, wherein the tilt angle is determined from a height (H) of the legs and a length (L) of the ramp region.

11. The weight transfer device of claim 10, wherein the tilt angle is determined from tangent(H/L).

12. The weight transfer device of claim 5, wherein the top surface and the legs are formed from at least one of wood, metal, and plastic.

13. A method for forming a weight transfer device, the method comprising:

forming a top surface having a ramp region and a load region; and forming legs mounted to the top surface, wherein the legs extend from a first end of the load region to a second end of the load region, wherein the ramp region extends away from the second end of the load region, wherein a downward force applied to the ramp region causes the load region to tilt about the second end, and wherein the ramp region has a curved profile shape such that a first width at one end of the top surface is less than a second width at an opposite end of the top surface.

14. The method of claim 13, wherein the legs have a height that is used to define a tilt angle of the weight transfer device, and wherein the legs extend linearly along a surface that is opposite the top surface of the weight transfer device.

15. The method of claim 13, further comprising:

disposing a load onto the load region of the weight transfer device before applying the downward force onto the ramp region.

16. The method of claim 13, wherein the weight transfer device has no wheels and no handlebar usable to apply an upward force.

* * * * *